(12) United States Patent
Shaw et al.

(10) Patent No.: US 6,934,018 B2
(45) Date of Patent: Aug. 23, 2005

(54) TIRE INSPECTION APPARATUS AND METHOD

(75) Inventors: Eugene L. Shaw, Lake Orion, MI (US); Forrest S. Wright, Rochester, MI (US)

(73) Assignee: Shearographics, LLC, Lake Orion, MI (US)

( * ) Notice: Subject to any disclaimer, the term of this patent is extended or adjusted under 35 U.S.C. 154(b) by 30 days.

(21) Appl. No.: 10/659,466

(22) Filed: Sep. 10, 2003

(65) Prior Publication Data

US 2005/0052637 A1 Mar. 10, 2005

(51) Int. Cl.[7] .......................... G01B 9/02; G01N 21/00
(52) U.S. Cl. .................... 356/237.2; 356/520
(58) Field of Search .......................... 356/237.1–237.2, 356/520, 35.5, 458; 73/146; 382/236

(56) References Cited

U.S. PATENT DOCUMENTS

| | | |
|---|---|---|
| 4,506,981 A | 3/1985 | Hoff, Jr. |
| 4,887,899 A | 12/1989 | Hung |
| 5,065,331 A | 11/1991 | Vachon et al. |
| 5,473,434 A | 12/1995 | de Groot |
| 5,481,356 A | 1/1996 | Pouet et al. |
| 5,671,050 A | 9/1997 | de Groot |
| 5,760,888 A | 6/1998 | Rottenkolber |
| 5,826,319 A | 10/1998 | Colwell et al. |
| 6,006,599 A | 12/1999 | Kelm-Klager et al. |
| 6,012,329 A | 1/2000 | Kelm-Klager et al. |
| 6,041,649 A | 3/2000 | Fembock |
| 6,188,482 B1 | 2/2001 | Cloud |
| 6,188,483 B1 | 2/2001 | Ettemeyer |
| 6,268,923 B1 | 7/2001 | Michniewicz et al. |
| 6,285,447 B1 | 9/2001 | Parker et al. |
| 6,362,873 B1 | 3/2002 | Facchini et al. |
| 6,433,874 B2 | 8/2002 | Lindsay et al. |
| 6,493,092 B1 | 12/2002 | Marklund |
| 6,496,254 B2 | 12/2002 | Bostrom et al. |
| 6,522,410 B1 | 2/2003 | Marcus et al. |
| 6,542,249 B1 | 4/2003 | Kofman et al. |
| 6,556,290 B2 | 4/2003 | Maeda et al. |
| 6,584,215 B1 | 6/2003 | Mahner |
| 6,791,695 B2 * | 9/2004 | Lindsay et al. ............. 356/520 |
| 6,840,097 B1 | 1/2005 | Huber et al. |

OTHER PUBLICATIONS

Y, Y, Hung, etal Full–field Optical Strain Measurement having Postrecording Sensitivity and Direction Selectivity, Presented at 1975 SESA Spring Meeting, Chicago, IL May 11–16.

AST 4000 Series Shearography Tire Inspection Systems, Laser Technology Inc. of Norristown, PA dated Sep. 1996.

* cited by examiner

Primary Examiner—Michael P. Stafira
(74) Attorney, Agent, or Firm—Reising, Ethington, Barnes, Kisselle, P.C.

(57) ABSTRACT

Described is an anomaly detector apparatus 10 for detecting an anomaly in a tire comprising: a source of coherent light 18 to shine the light 27 directly onto the tire surface 24 and the light being reflected 32 from the tire; a stressing apparatus 12 which can stress the tire; a reflected light receiving apparatus 40 for receiving the light 32 reflected directly from the tire surface 24 when the tire is in a stressed and unstressed condition; a processor 44 which compares images of reflected light from the reflected light receiving apparatus 40 when the tire is stressed and unstressed thereby ascertaining an anomaly in the tire and generates an output from the comparison; and a display apparatus 46 electronically connected to the processor for displaying the output from the processor.

24 Claims, 5 Drawing Sheets

TIRE INSPECTION APPARATUS AND METHOD

FIELD OF THE INVENTION

The present invention pertains to the field of Non-Destructive Testing. (NDT) In particular the invention pertains to such testing of tires, utilizing a computer for automated output display of an image of the tested tire.

BACKGROUND OF THE INVENTION

Figure 1:
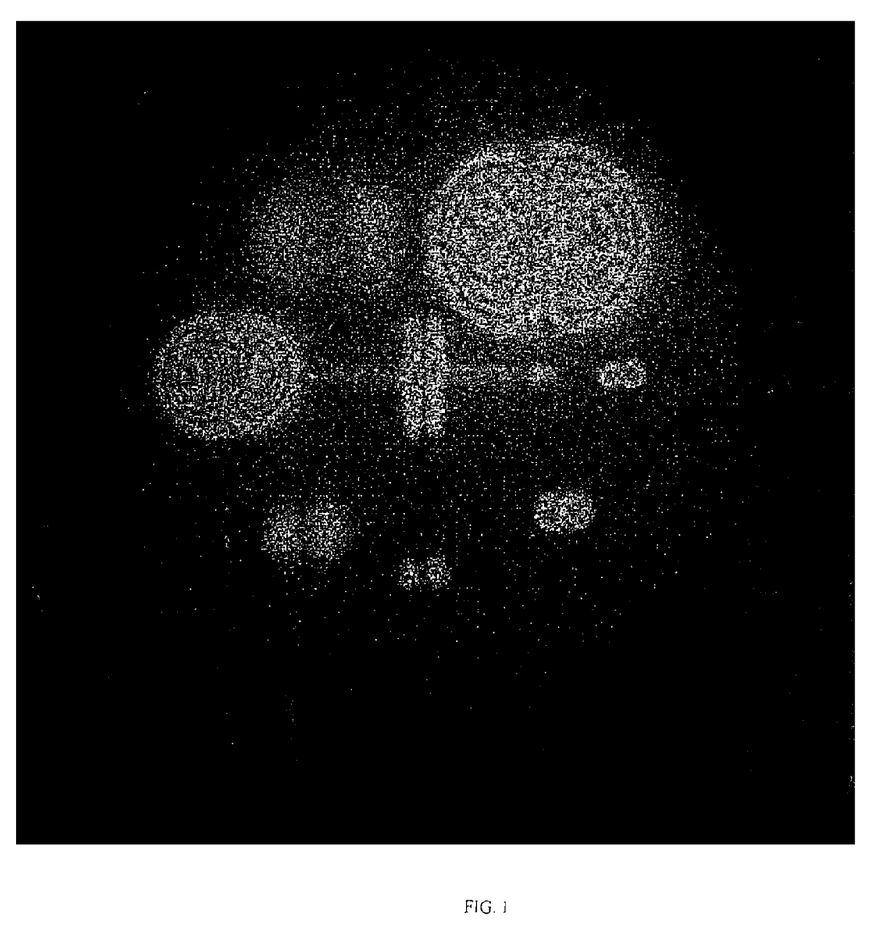
FIG. 1 is a prior art shearogram.

For many years the standard practice for calibrating shearographic/holographic tire testing machines has been ASTM F1364-92. This test method describes the construction and use of a calibration device for demonstrating the anomaly detection capability of an interferometric laser imaging non-destructive tire inspection system. A typical shearographic fringe pattern resulting from such testing technique is shown in FIG. 1.

As has been described in U.S. Pat. No. 6,433,874 the technique of shearing interferometry, or shearography involves the interference of two laterally-displaced images of the same object to form an interference image. Conventional shearographic methods require that a first interference image (or baseline image) be taken while the object is in an unstressed or first stressed condition, and another interference image be taken while the object is in a second stressed condition. Comparison of those two interference images (preferably by methods of image subtraction) reveals information about the strain concentrations and hence the integrity of the object in a single image called a shearogram. FIG. 1 shows an image which is the direct result of two laterally-displaced images being obtained by an interference technique. The images that are obtained are not to the scale of the anomaly in the tire. In addition very minute anomalies, those in the order of 1.7 mm are not readily ascertainable from a shearogram such as that shown in FIG. 1.

While some systems for shearography have an output such as the display of computerized systems of the '874 patent, many of the systems utilized are such that they have an output of highly sensitive film which is extremely costly and requires a special viewing device. Further, film based shearographic tire testing machines (and individual tire tests) are typically very expensive therefore a limited number are utilized in the industry within individual plants.

The electronic shearography of the '874 patent is based upon the shearography described in U.S. Pat. No. 4,887,899 which describes an apparatus which produces an interference image by passing light, reflected from the test object, through birefringent material and a polarizer. The birefringent material splits a light ray into two rays and polarizing it makes it possible for light rays reflected from a pair of points to interfere with each other. Thus each point on the object generates two rays and the result is an interference image formed by the optical interference of two laterally displaced images of the same object.

There is a need for improved tire testing technique and apparatus which facilitate direct measurements which permit a quantitative analysis or a scalability of the anomaly in the tire.

There is a need to obtain an output from tire testing equipment which does not rely upon an interferogram or proprietary optics, thereby making the output of such testing technique accurately describe and identify the anomaly.

There is a need for a tire testing technique and apparatus which permits the utilization of coherent light and the reflection of such light to be captured by inexpensive equipment and displayed using commonly available computerized systems.

It is accordingly an object of the invention to provide an approved tire testing technique and apparatus which facilitates direct measurements, and a quantitative analysis or scalability of the anomaly in the tire.

It is an object of the present invention to provide a tire testing technique and apparatus which does not rely upon an interferogram to accurately describe and identify the anomaly.

It is an object of the present invention to provide a tire testing technique and apparatus which permits the utilization of coherent light and reflection of such light to be captured by inexpensive equipment and displayed using commonly available computerized systems which does not utilize laterally-displaced images but a single image of the anomaly as output.

SUMMARY OF THE INVENTION

Described is an anomaly detector apparatus for detecting an anomaly in a tire comprising: a source of coherent light to shine the light directly onto the tire surface with the light being reflected from the tire; a stressing apparatus, which can stress the tire; a reflected light receiving apparatus for receiving the light reflected directly from the tire when the tire is in a stressed and unstressed condition; a processor which compares images of reflected light from the reflected light receiving apparatus when the tire is stressed and unstressed thereby ascertaining an anomaly in the tire and which generates an output from the comparison; and a display apparatus electronically connected to the processor for displaying the output from the processor.

Also described is a method of detecting an anomaly in a tire comprising: providing a source of coherent light; shining the light directly onto the tire surface, thereby generating a reflected light from the tire; stressing the tire; providing a reflected light receiving apparatus for receiving the light reflected directly from the tire when the tire is in a stressed and unstressed condition; providing a processor which captures and compares images of reflected light from the reflected light receiving apparatus when the tire is stressed and unstressed and generates an output from the comparison thereby ascertaining an anomaly in the tire; and displaying that output from an apparatus electronically connected to the processor from the output of the processor.

Also described is an image of an anomaly of a tire comprising: an output from a computer wherein the output is from a reflected single diffused beam of a source of coherent light shown directly onto a tire surface where in the tire surface has had the light shown on it when the tire is in a stressed and unstressed condition; the output is the result of comparing the reflected light shown onto the tire in a stressed and unstressed condition or in multiple stressed conditions; and the output is characterized as a single image of the anomaly obtained from the single diffused beam of coherent light shown onto the tire.

BRIEF DESCRIPTION OF THE DRAWINGS

These and other objects, features and advantages of this invention will be apparent from the following detailed description, appended claims and accompanied drawings in which;

DETAILED DESCRIPTION OF THE INVENTION

Definitions

Anomaly is defined as a defect in a tire which can generally be characterized as air trapped in a cured tire as a result of variations in the thickness of the tire components; porosity and voids in the tire, a separation, an undercure of the tire, trapped air and bubbles; low interply adhesion, poor cord adhesion, bare wires, broken cords, and machine building errors.

Bitmap is a data file or structure which corresponds bit for bit with an image displayed on a screen, preferably in the same format as it would be stored in the display's video memory or alternatively as a device independent bitmap. A bitmap is characterized by the width and height of the image in pixels and the number of bits per pixel which determines the number of shades of grey or colors it can represent.

Coherent light is a light having a single wavelength, frequency and phase. It is also radiant electromagnetic energy of the same, or almost the same wavelength, and with definite phase relationships between different points in the field.

Differenced or also known as delta frame means an animation frame that contains only the pixels different from the preceding key frame.

Diffuser is an apparatus which transmits light through a translucent material which permits the distribution of incident light onto the tire to be tested.

Interferometer is an instrument in which light from a source is split into two or more beams which are subsequently reunited after traveling over different paths and display interferences.

Laser is a device that produces a beam of coherent and monochromatic light as a result of photon-stimulated emission. Such beams have a single wavelength and frequency. Materials capable of producing this effect are certain high period crystals such as ruby, yttrium garnet, metallic tungstates or molybdates doped with rare earth ions; semiconductors such as gallium arsenide, neodymium-doped glass; various gasses, including carbon dioxide, helium, argon, neon, and plasmas, and the like.

Laterally-displaced is a term that means, what appears to be a double or side by side image but is actually a positive and negative optical interference of a single anomaly. Further laterally means side by side but depending on the orientation of the optical element in the device could be any angle.

In this form of Non-Destructive Testing (NDT), non-destructive means a testing technique where the object to be tested is subjected to a stressing element and at the end of the testing the object is reverted to substantially its original condition.

The processor is a device or software, usually a central processing unit; it can also be a program that transforms some input into some output such as a computer or linkage editor; it facilitates the comparisons of images; it may be a hardwired device using embedded instructions to perform the comparisons.

Stressing element means an element that is used to apply stress or strain to an object to cause a change from it's original condition. Such stressing can take the form of the application of a vacuum, the application of light, the application of a gas, the application of a mechanical force to permit flexing, the application of acoustical sound thereby vibrating the tire, or some other vibrating technique.

In general, the apparatus and method of the present invention can be described as follows:

The inside surface of the tire is a diffuse reflective surface, verses a mirror which is a specular reflective surface. A speckle pattern is visible on diffuse rather than specular reflective surfaces that is illuminated with laser light. These reflections from the anomalous regions change during the stressing cycle as the surface deforms. With multiple images captured by the camera during this cycle, the computer can process the image information using a software algorithm such as that described in FIG. 4A and FIG. 4B. In the present invention light does not pass through a birefringement material or a shearing optic material.

A typical test setup for the present invention is described as follows: The tire to be inspected is placed horizontally on a plate within a vacuum chamber. A commonly available industrial digital camera sits in the center of the tire so as to view a region of the inside surface of the tire such as camera model LU-205C available from Lumenra Coporation of Ottawa, Ontario, Canada (Lumenera.com) which is a color 2.0 megapixel having SVGA (800×600) sub-sampling which provides 40 frames/sec. The digital camera uses a commonly available lens to focus the reflected speckle pattern image of the tire region on the digital image sensor.

A cable connects the camera to a computer. Image information is sent through this cable to the computer memory. Images from memory can be viewed on the computer display in near real-time, i.e., as the images are captured and processed by the equipment.

Generally each image will be stored in memory as a black/white bitmap file whereby 8 bits are used to store the gray-scale levels of each image sensor picture element, or pixel, value. Likewise, the images viewed on the computer display will be of the form of 8-bit, gray-scale, bitmap display images corresponding to the bitmap images, as the images are stored in memory. There are $2^8=256$ (from 0 to 255 decimal) possible gray-scale 8-bit values associated with each pixel of the displayed images. The decimal value, "0," as it directly represents the gray-scale level of individual display image pixels, corresponds to a black pixel, the darkest gray-scale pixel. Similarly, the decimal value, "255," represents the lightest gray-scale pixel, which is "white." The remaining numeric values between 0 and 255 represent a progression of gray levels from dark to light.

Note that two digital images that are exactly equivalent will have the same numeric values, from 0 to 255, for every image pixel. Conversely, two digital images that are not equivalent will not have the same numeric values for every image pixel. The arithmetic difference between every corresponding image pixel of two exactly equivalent digital images will be 0. This means that the difference image obtained from differencing two equivalent digital images will be displayed as a totally black image. The difference image obtained from differencing two dissimilar digital images will not be a totally black image. The image differencing function provides a tool for observing slight changes between two digital images.

In one embodiment the stressing element is the use of vacuum. The speckle pattern associated with a given region of a tire will change with very small deformations of the tire surface. Such surface deformation occurs when the pressure drops in the vacuum test chamber and the air inside of a ply separation expands creating a deformation on the interior tire surface.

Practically speaking the two speckle pattern images of a tire surface region where there exists an underlying localized ply separation will be different if the two images are taken at different vacuum levels. Also the images will only be numerically different in the deformation region associated with the ply separation. The difference image of the two images will be black everywhere except the area where the deformation occurs. In the deformation region of the image there will be grey pixels of various shades. The deformation region is visible in the differenced image.

In one embodiment of the test method, six digital images of a laser illuminated interior surface region of a tire are taken with each image taken at one-of-six vacuum levels. The laser is a gallium arsenide laser having a wavelength of 808 nm (nanometer), model UH5-200 808 supplied by World Star Tech. of Toronto, Ontario, Canada (worldstartech.com). The first image will be taken at 0.0" Hg (atmospheric pressure). This first image will be called the base image. The five remaining images will be taken respectively at 0.5, 1.0, 1.5, 2.0, and finally 2.5" Hg. The six images will be stored in computer memory. Next five differenced images will be obtained using the base image always as one of the two images to be differenced. The other images used to make the five differenced images will be the five non-base images. Each of the five differenced images will be processed to filter out noise and increase contrast/brightness. Other processing may also be used. Any combination of available or custom image processing software including: auto anomaly detection, special effects, filtering, noise reduction, sharpening, dilation, colorization, positive or negative or the like. The five processed images will be added together in an accumulative fashion. After each addition of two images, the new image formed by the addition will be processed. The final image will be used for evaluation for the given tire region. There will be a plurality of inspection regions inspected using the preferred test method in order to evaluate the complete tire.

It is to be appreciated that a display is meant to cover varied electronic output of the images whether visible to the naked eye or not and includes a screen display, hard copy or an electronic image. The electronic image may be used to determine whether the test object passes or fails testing criteria without actually displaying the image to the naked eye.

Turning now to the drawings in the case.

FIG. 1 is a prior art shearogram obtained from the testing fixture identified in ASTM F 1364-92. For ease of readability, FIG. 1 is a black on white image as opposed to a white on black image which is one output from the ASTM test. It should be noted that the anomalies in that output are laterally-displaced images.

Figure 2:
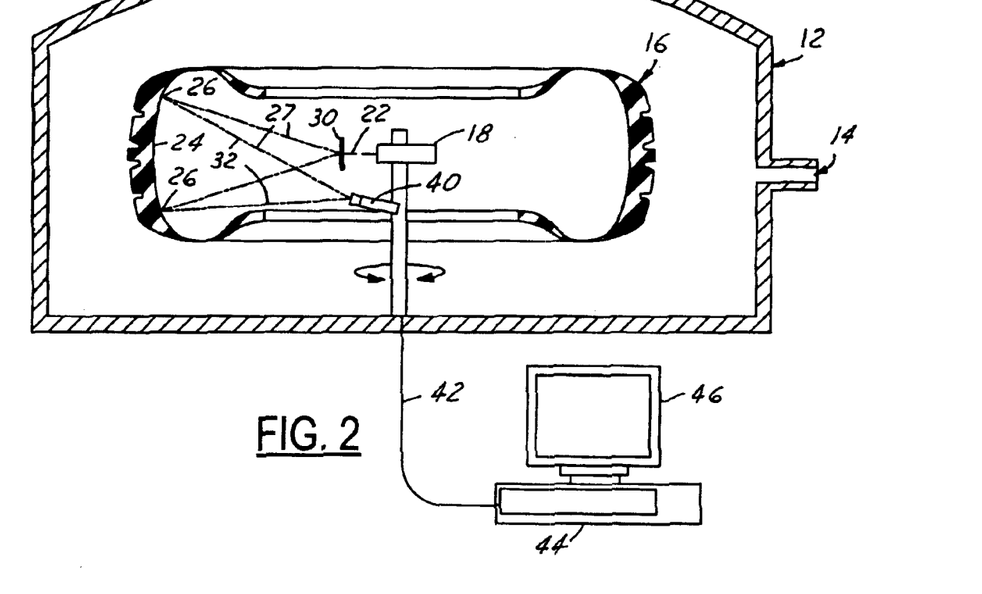
FIG. 2 is a schematic representation of the apparatus of the present invention.

FIG. 2 is a schematic diagram of the anomaly detector apparatus of the present invention. In general, the anomaly detector apparatus 10 is encased within a vacuum chamber 12 which is indicated as having a vacuum outlet 14. The tire 16 can be placed on a carrying member (not shown) and can be placed on a motorized conveyer (not shown) outside the vacuum chamber and moved into the vacuum chamber. Such techniques are well known in the art. The anomaly detector apparatus is comprised of the laser 18 mounted on a shaft 20 which can be rotated as well as moved forwards and back in the vacuum apparatus. The coherent light 22 emitted from the laser 18 reflects on the inner surface 24 of the tire at points 26 as well as numerous other points. The coherent light 22 from the laser 18 is passed through a diffuser 30 which facilitates the spreading of the light across the portions of the tire substrate 24 to be viewed. The diffused light 27 is reflected off of the points 26 in a speckled fashion which are reflected off of the substrate 24 as shown by beams 32. The light is speckled and is captured in a camera 40. Preferably, the camera or cameras are a CCD variety well known in the industry as a charged coupled device. Other photosensitive detection equipment may be utilized. The camera can be called an image sensor, namely, it senses the speckled image 32 from the application of direct laser light onto the tire surface 24.

The diffuser is a holographic diffuser of 25 mm diameter with higher diffuser transmission efficiency. Alternatively the diffuser may be opal diffusing glass having a diameter of 25 millimeter, both available from Edmund Industrial Optics of Barrington, N.J.

The camera and the computer are electrically connected through wire 42. It is to be appreciated that while electrical current may be necessary for the operation of the laser and the camera, the output from the camera could likewise be supplied to the computer 44 by well known wireless communication techniques represented by parallel lines 43. The computer hard drive 44 is attached to a monitor 46 for display of the speckled output 32.

Figure 3A:
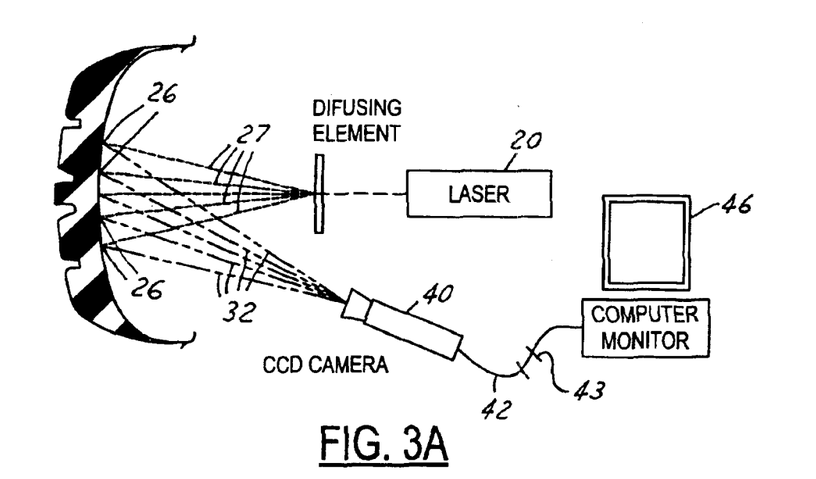
FIG. 3A is a schematic drawing of the tire testing equipment where the tire is in an unstressed condition.
Figure 3B:
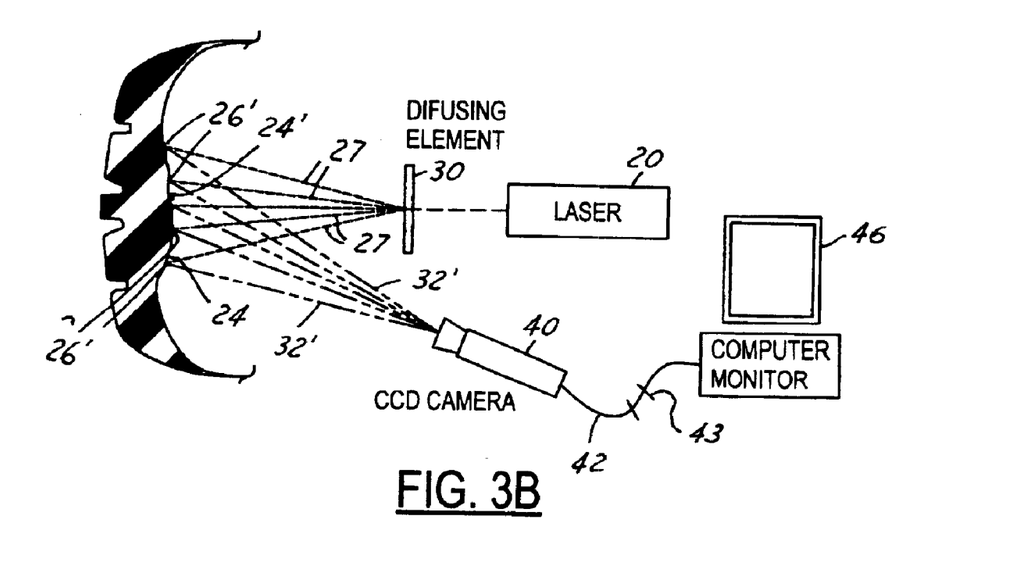
FIG. 3B is a schematic drawing of the tire testing equipment where the tire is in a stressed condition.

It is to be appreciated that the coherent laser light that is diffused onto the substrate 24 is reflected off of the substrate and the capturing is a direct capture of the reflections 32 by the CCD 40. This is unlike that which is utilized in prior art shearograms or interferometry which use an optical shearing device. The direct output of the device shown in FIGS. 2, 3A and 3B is that shown in FIG. 5. It is to be appreciated that the output of FIG. 5 can be either black on white or white on black depending on how one wishes to view the desired output. Because the image is captured by an image sensor, each pixel of the image can be identified or stored in digital form, as such, one can assign colors to different portions of the image, besides a white or black color thereby enhancing the image.

In a similar fashion, the operation of the equipment is shown in FIGS. 3A and 3B where there are larger number of diffused rays 27 at different points 26. The light 27 from the diffusing element 30 is dispersed as is shown in FIGS. 2, 3A and 3B.

After the tire is subjected to a stressing element such as application of a vacuum, the application of light, the application of gas, the application of a mechanical force to permit flexing, the application of acoustical sound thereby vibrating the tire or some other vibrating technique, the result is the movement of the tire substrate 24 which in turn causes a reflection of the laser light from points 26. FIG. 3B shows in an exaggerated fashion the variation from the smooth surface 24 of the tire to an expanded version or deformation 24 that is depicted. The laser light therefore is deflected at a different angle and therefore is shown as reflected speckled light 32 which creates images that are captured by the CCD camera 40.

The electrical cable 42 is shown as having parallel marks 43 to indicate that there may not necessarily be a direct wire for passing the images from the camera to the computer monitor but may be done by a wireless technique. The capturing of images on a camera is well known in the art. It can take the form of animation of images, which techniques are well known.

Figure 4A:
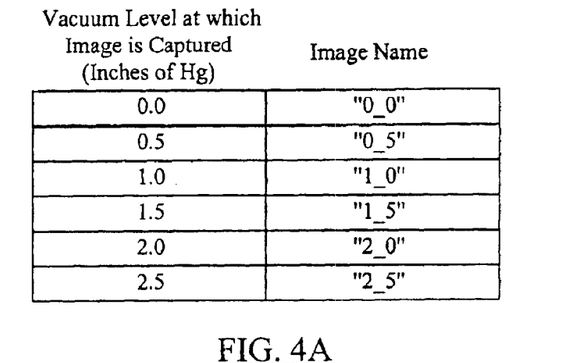
FIG. 4A is a legend for FIG. 4B. This legend serves to name the images captured with the tire subjected to various levels during the sequence of steps used in FIG. 4B.
Figure 4B:
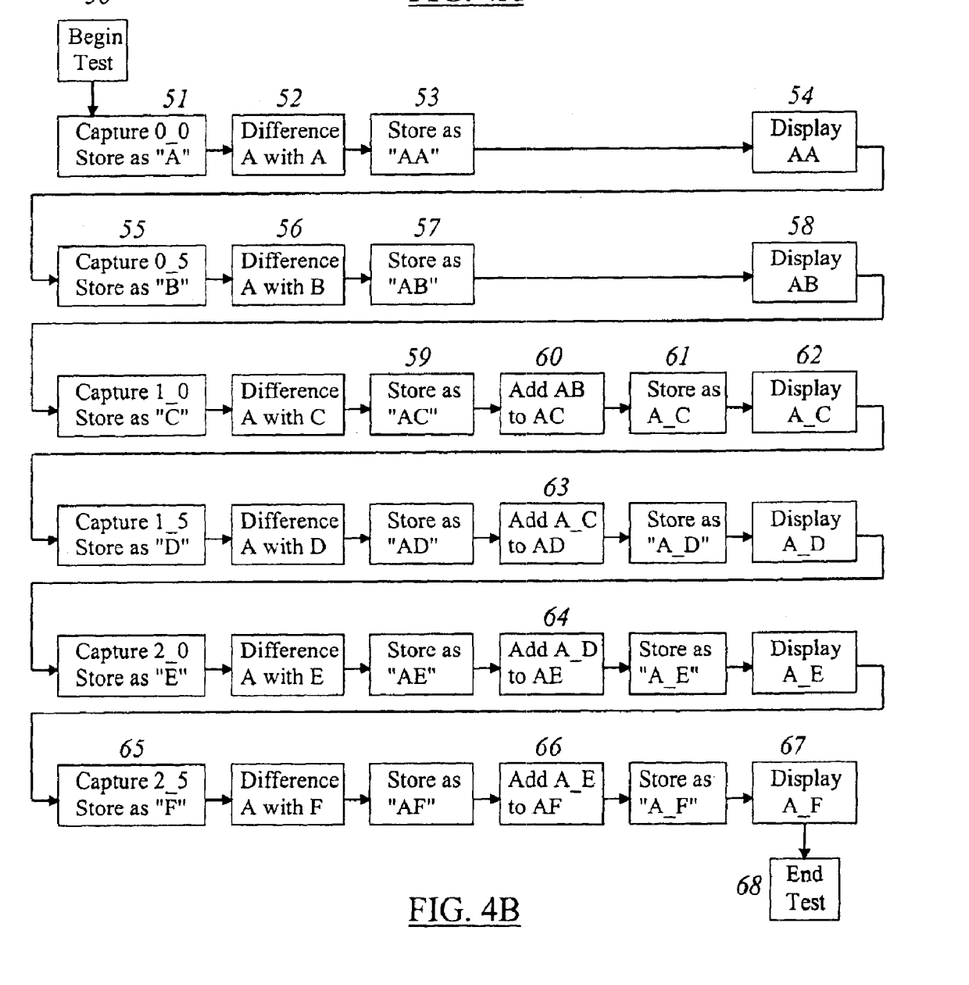
FIG. 4B is a block diagram of the sequences of computations of a computer to capture and process different images of the unstressed and stressed conditions as the typical stressing conditions are applied, such as an application of vacuum.
Figure 5:
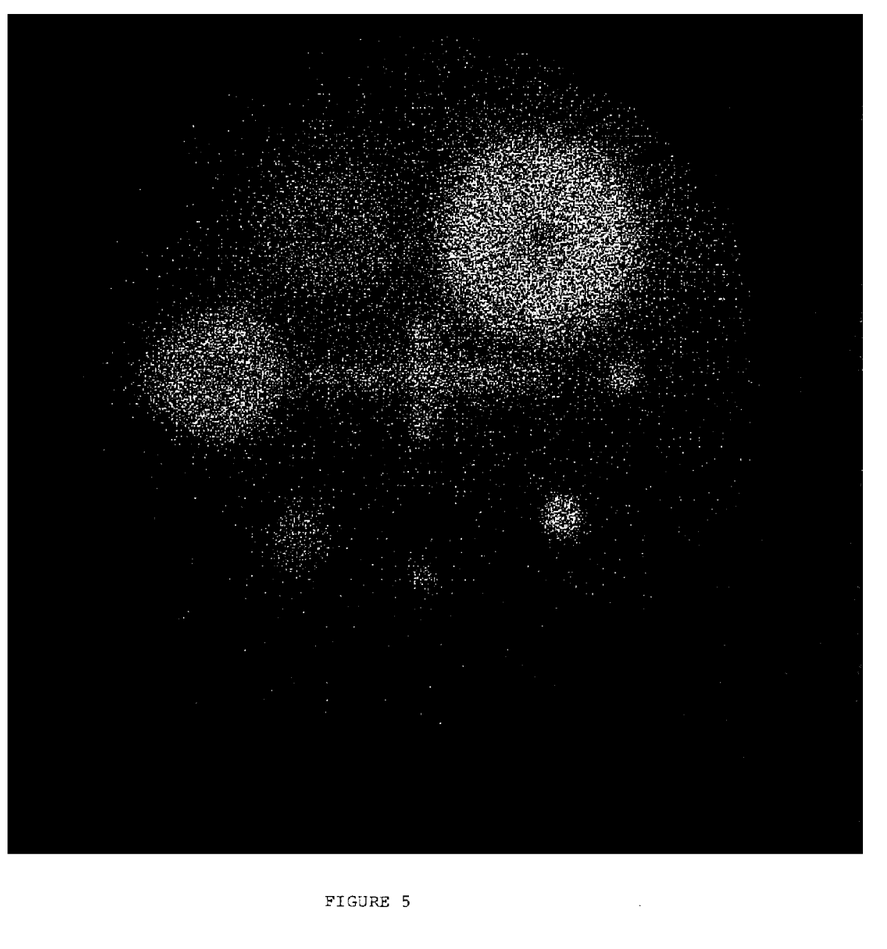
FIG. 5 is a typical output of the tire testing apparatus showing a calibration block used as the test object, and method of the present invention.

To graphically explain how the animation occurs reference can be made to FIGS. 4A and 4B. FIG. 4A shows a legend whereby images that are captured at various vacuum levels are given names for reference purposes. FIG. 4B shows the sequence of steps used for evaluating one region of the inside surface of a tire. The test sequence begins at the box designated as 50 and ends at step 68. At 51 the base image of the tire region is captured while the tire is unstressed and subjected to 0.0" Hg (atmospheric pressure). From the legend shown in FIG. 4A, this image is designated 0__0. This base image, referenced as 0__0, is stored as image "A" during step 51. For consistency, at box 52, the base image is differenced with itself to provide a black image that is displayed as the first image of the animation. This image is stored at 53 as "AA". It can be appreciated that a black image could have been produced in software without actually imaging the tire region, however, the base image "A" is captured since it is used in subsequent steps of the test sequence. After image AA is displayed at 54 the next image is captured at step 55 while the tire is subjected to 0.5" Hg vacuum. This image, "0__5," is stored as "B" in step 55. At 56 the image, B, is differenced with the base image, A, producing image, "AB," which is stored in step 57. AB is then displayed at 58 and AB serves as the $2^{nd}$ image in the animation sequence. At step 60, as well as subsequent steps, 63, 64, 66, the previously displayed image is added to the image formed in the immediately preceding steps. For example, at step 60, the previously displayed image is AB and the image added to this image is the just-formed image, "AC" stored at step 59. The newly formed image is stored as "A__C" at step 61. A__C is then displayed at step 62. During the course of the test, images are captured at 0.5" Hg increments with the final image, "2__5," being captured with the tire subjected to 2.5" Hg vacuum (step 65). At 67 the final image in the animation sequence is displayed. The Images obtained during the tire test can be the subject of a printed output as shown in FIG. 5. A representative of such a technique is shown at FIG. 5 where the procedure, as followed in the ASTM testing technique described above, was utilized, except the apparatus of FIGS. 1 and 2 were used in place of an interferometer technique.

It is also to be understood that even though FIGS. 4A and 4B. shows the vacuum cycle from 0.0 Hg. to 2.5 Hg, any combination of vacuum levels or set points increasing or decreasing may be used. As an example from 5.5 Hg. to 1.0 Hg.

Software that is utilized to process the speckled image and to display it can be any commercially available image processing software such as PAINT SHOP PRO V. #8.0, supplied by Jasc Software Inc., of Eden Prairie, Minn. Other software that can be used is LabView available from National Instruments of Austin, Tex.

FIG. 5 is a representative example of any one of images AA through A__F when the ASTM procedure is utilized except the apparatus of FIGS. 1 and 2 were used in place of an interferometer technique. FIG. 5 shows an image of an ASTM calibration device where the image is a reflected image from the substrate of the calibration device that has been stressed and the laser light has been diffused directly onto the substrate and the reflection of a diffused light is captured as a speckled image by the camera and is stored in the computer memory which in turn can be utilized to generate the output of FIG. 5. It should be noted that the output is characterized as a scaleable representation of the anomaly obtained from the diffused beam of coherent light diffused onto the tire. It should be noted that the image of the reflected light source can be characterized as a scattered speckle reflection. It is to be appreciated that the tire may be in an unstressed and stressed condition or multiple stressed conditions. The computer can compare and display all of the conditions or a portion of them. The invention includes all such comparisons in the completed output form.

The utilization of the present technique facilitates quantitative measurement of the anomaly. Alternative to a quantitative determination one can assess the extent of the anomaly by scaling the anomaly with the image that is shown on the computer monitor or is generated in the output such as FIG. 5. Prior art techniques did not permit such measurements or scaling of the anomaly to ascertain the extent of an anomaly in a tire.

The invention described herein in a preferred embodiment does not utilize mirrors for movement of the light. However it is to be appreciated that mirrors may be used depending on the light source, the camera, the diffuser, the test substrate and the number of images to be taken of the substrate. Mirrors may be utilized under particular desired testing techniques and conditions.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting and that various changes may be made without departing from the spirit or the scope of the invention. For example the type of laser to be utilized can vary substantially; the software in the computer that is described herein can be varied depending upon the changes in technology with respect to the computer or computer devices and updates to the types of software.

We claim:

1. An anomaly detector apparatus for detecting an anomaly in a tire comptising:

a source of coherent light to shine the light directly onto the tire surface with the light being reflected from the tire;

a stressing apparatus, which can stress the tire;

a reflected light receiving apparatus for receiving the light reflected directly from the tire when the tire is in a stressed and unstressed condition;

a processor, which compares images of the direct reflected light from the reflected light receiving apparatus when the tire is stressed and unstressed thereby ascertaining an anomaly in the tire and which generates an output from the comparison; and a display apparatus electronically connected to the processor for displaying the output from the processor.

2. The apparatus of claim 1 wherein the light does not pass through a birefringement material or a shearing optic material.

3. The apparatus of claim 1 where the source of light is a laser.

4. The apparatus of claim 1 further comprising a diffuser placed between the source of light and the tire to distribute the light over a portion of the tire surface.

5. The apparatus of claim 1 further comprising a diffuser placed between the source of light and the tire to distribute the light over a portion of the tire with even distribution.

6. The apparatus of claim 1 wherein the reflected light receiving apparatus is a camera.

7. The apparatus of claim 6 wherein the camera is electronically connected to a computer.

8. The apparatus of claim 1 wherein the processor is software operating in a computer which displays the output.

9. A method of detecting an anomaly in a tire comprising:

providing a source of coherent light;

shining the light directly onto the tire surface, thereby generating a reflected light from the tire;

stressing the tire;

providing a reflected light receiving apparatus for receiving the light reflected directly from the tire when the tire is in a stressed and unstressed condition;

providing a processor which views and compares images of the direct reflected light from the reflected light receiving apparatus when the tire is stressed and unstressed thereby ascertaining an anomaly in the tire and generates an output from the comparison; and displaying, from apparatus electronically connected to the processor, the output from the processor.

10. The method of claim 9 wherein the light does not pass through a birefringement material or a shearing optic material.

11. The method of claim 9 where the source of light is a laser.

12. The method of claim 9 further comprising distributing the light over a portion of the tire by a diffuser placed between the source of light and the tire.

13. The method of claim 9 further comprising distributing the light over a portion of the tire with even distribution of light by a diffuser placed between the source of light and the tire.

14. The method of claim 9 wherein the reflected light receiving apparatus is a camera.

15. The method of claim 14 further comprising passing the images from the camera to a computer.

16. The method of claim 9 wherein the processor is software operating in a computer which displays the output.

17. The product of the method of claim 9.

18. An image of an anomaly of a tire comprising an output from a computer wherein the output is from a reflected diffused beam of a source of coherent light shown directly onto a tire surface which tire surface has had the light shown on it when the tire is in a stressed and unstressed condition;

the output is the result of comparing the direct reflected light shown onto the tire in a stressed and unstressed condition or in multiple stressed conditions; and the output is characterized as a single image of the anomaly obtained from the diffused beam of coherent light shown onto the tire.

19. The image of claim 18 wherein the light does not pass through a birefringement material or a shearing optic material.

20. The image of claim 18 scaled to size the anomaly in the tire.

21. The image of claim 18 where it is characterized as a scattered speckle reflection.

22. The image of claim 18 wherein the source of light is passed through a diffuser before the light shines on the tire surface.

23. The image of claim 18 wherein the output is black on white or white on black.

24. The image of claim 18 wherein the output is in multiple colors to enhance visibility of the image.

* * * * *

UNITED STATES PATENT AND TRADEMARK OFFICE
CERTIFICATE OF CORRECTION

PATENT NO. : 6,934,018 B2 Page 1 of 1
DATED : August 23, 2005
INVENTOR(S) : Shaw et al.

It is certified that error appears in the above-identified patent and that said Letters Patent is hereby corrected as shown below:

Column 8,
Line 41, after "tire" delete "comprtising" and insert there -- comprising --.

Signed and Sealed this

Eighth Day of November, 2005

JON W. DUDAS
*Director of the United States Patent and Trademark Office*